(12) United States Patent
Pedley et al.

(10) Patent No.: US 9,799,173 B2
(45) Date of Patent: Oct. 24, 2017

(54) LIST BASED SHOPPING CART INSPECTION PROCESS

(71) Applicant: Wal-Mart Stores, Inc., Bentonville, AR (US)

(72) Inventors: Douglas James Pedley, Portland, OR (US); Richard Neil Cancro, Portland, OR (US); Joel Bennett Acker, Jr., Brush Prairie, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 531 days.

(21) Appl. No.: 13/754,713

(22) Filed: Jan. 30, 2013

(65) Prior Publication Data

US 2014/0214609 A1 Jul. 31, 2014

(51) Int. Cl.
*G06Q 30/00* (2012.01)
*G07G 1/00* (2006.01)
*G06Q 20/20* (2012.01)
*G06Q 30/06* (2012.01)
*G07G 3/00* (2006.01)

(52) U.S. Cl.
CPC ............ *G07G 1/009* (2013.01); *G06Q 20/20* (2013.01); *G06Q 20/203* (2013.01); *G06Q 20/208* (2013.01); *G07G 1/0036* (2013.01); *G07G 1/0045* (2013.01); *G06Q 30/0609* (2013.01); *G06Q 30/0633* (2013.01); *G07G 3/003* (2013.01)

(58) Field of Classification Search
CPC ...... G06Q 30/00–30/08; G06Q 20/20–20/208; G07G 3/003; G07G 1/0036–1/009
See application file for complete search history.

(56) References Cited

U.S. PATENT DOCUMENTS

| 6,092,725 | A | * | 7/2000 | Swartz et al. | 235/383 |
| 2007/0194112 | A1 | * | 8/2007 | Petroskey | 235/383 |
| 2011/0145093 | A1 | * | 6/2011 | Paradise et al. | 705/26.41 |
| 2014/0067568 | A1 | * | 3/2014 | Argue | G06Q 10/08 705/21 |
| 2014/0164176 | A1 | * | 6/2014 | Kitlyar | 705/26.8 |

OTHER PUBLICATIONS

"IBM and UNIQUEST Incorporated to Market Customer Self-Checkout Systems." Stichfield, Charlie. PR Newswire; New York [New York] Dec. 14, 1992. Retrieved via ProQuest.*

* cited by examiner

*Primary Examiner* — Michael Misiaszek
(74) *Attorney, Agent, or Firm* — Bryan Cave LLP (57) ABSTRACT

A computer-implemented process is useful for inspecting a shopping cart in preparation for a rapid checkout from a retail store, the shopping cart including items scanned for purchase by the customer during a shopping trip in the retail store. The process includes monitoring, within a computerized server, an initiation of a rapid checkout by the customer and generating, within a computerized processor, an inspection list for a store employee based upon the initiation. The inspection list includes a summary of items scanned by the customer.

14 Claims, 6 Drawing Sheets

LIST BASED SHOPPING CART INSPECTION PROCESS

BACKGROUND INFORMATION

Field of the Disclosure

The present disclosure relates generally providing a list of items scanned by a customer during a shopping trip in a retail store. More particularly, the disclosure includes a process to enable inspection of a shopping cart based upon the list to determine any error between the list and actual items in the shopping cart.

Background

Shoppers select products from the aisles of a store, place them into a shopping cart, and proceed to a checkout line. At the checkout line, they remove the products from the cart and place them onto a conveyor belt that is fed to a cashier. In another embodiment, self-scan checkout lines permit customers to scan and bag their own purchases, supervised by a scale and one cashier per group of self-checkout lines. The function of this cashier was two-fold; loss prevention and to assist customers.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or processes have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

An individual wishing to achieve a faster shopping experience by skipping the check-out line. In one exemplary embodiment, a shopper can use a portable computerized device, such as a smart phone, a tablet computer, or glasses configured to project images in a view of the user, and more particularly, a camera device equipped to the device, to scan items for purchase. These scanned items can be added to an electronic billing statement, the items can be placed in the shopping cart, and a rapid or abbreviated checkout process can be utilized to permit the shopper to pay and go, thereby skipping long lines at a cashier-manned checkout station or the hassle of a self-scan checkout.

Any shopping process including a non-employee placing items from a retail store in a cart and the cart leaving the store without each product being inspected by a store employee is prone to error and abuse. A shopper with responsibility to scan each item in order to increase the amount to be paid for the order by the price of the item being scanned can think that a part was scanned and accidentally place the item in the cart without scanning it. In such an event, the cart includes an item that will not be paid for when the shopper pays for the scanned items. Similar conditions can occur when children are accompanying a parent to the store, wherein one child may be distracting the parent and another child may put an item that he or she wants in the cart, not understanding the idea of the customer scan system. Such a system is an opportunity for dishonest people, wherein a shopper passing by a jewelry counter can hide a pair of un-scanned earrings under a stack of bananas.

One process that can be implemented to permit customers to scan items, place the items into a cart, and quickly pay and leave the store can include an inspection process, wherein store employees can be located near an exit or exits of the store and perform quick inspections of the carts leaving the store. Such a process can include a rapid checkout server providing a list of items that each cart leaving the store should include. Such a list can be printed or provided on a display screen, for example, by a push notification to an electronic device. Such a push notification can be based upon a location of the customer or by an indication by the customer that he or she is checking out. The list can be tied to a particular customer, for example, by last name or the list can be tied to an indexed or numbered cart. By providing the store employee or employees with a list for each cart or customer leaving the store, the occurrence of items leaving the store without being paid for can be reduced.

A process including providing a list of items that should be in a cart leaving the store can include the store employee visually inspecting the details of every item of every order. Such a list of items can be described as an inspection list. However, such a process would necessarily be similarly slow to a cashier-manned checkout line, with the employee counting apples and sorting various canned goods to make sure that every item is accounted for. Various embodiments of streamlined checkout inspection processes are envisioned. A number of examples are illustrated, but the disclosure is not intended to be limited to the particular examples provided herein An inspection list can simply include a tally of every item scanned by the shopper. However, by categorizing and/or summarizing the scanned items into categories, the checkout process can be accelerated and the shopper can feel that the employee is trusting the customer more than if the employee simply checks every single item. For example, if the inspection list provides the employee a list stating that the customer only scanned food products, and the employee sees any non-food product, the employee can know that there's a problem. If the inspection list tells that employee that the customer purchased seven food goods and four clothing items, the employee can quickly count the items without needing to do a detailed inspection of every item.

An inspection list can flag particularly high value or particularly easy to miss items. For example, the inspection list can flag that the customer scanned a forty dollar box of pills. A trained employee can scan every cart for such high value but easy-to-miss items with the list at the ready to quickly confirm that such an item was correctly scanned. A store can facilitate such a high value inspection, for example, by placing a bright yellow sticker on all items qualifying as high value. In this way, an employee can quickly see three yellow stickers on products and quickly check the inspection list to see that three high value items were scanned.

RFID chips are known in the art to provide an electronic proximity signal. For example, an RFID chip can be placed on a high value item, and a portable computerized device of an employee inspecting carts leaving the store can be equipped to sound an alert when an RFID chip is detected. When used in known processes with alarms placed near an exit of a store, the store typically wants the chip to be able to be removed or deactivated prior to a paying customer nearing the alarms to avoid embarrassing the customer by having the alarms go off. Such easy to access or disable RFID chips are inherently subject to tampering by dishonest actors. If used according to the present disclosure, RFID chips could be located internally to the packaging of the product, making disabling or removing the RFID chip more difficult, since only the inspecting employee will be notified of the presence of the active RFID chip. An inspection list can highlight the presence or absence of scanned items that should have RFID chips, thereby accelerating the inspection process.

Customers can be required to register with the store in order to be eligible for the customer scan and rapid checkout process. The store can then accumulate information regarding the reliability of a particular customer, a frequency that the customer shops at the store, a frequency that the customer uses the rapid checkout system, a frequency that errors are discovered in the checkout inspection, and other relevant information. A customer can be classified based upon past performance in the system. Such a classification can be as simple as the customer being classified as "low-risk" or "high-risk." In another alternative, a customer can be assigned a rapid checkout score, with the customer starting at 50 points, and with the score improving closer and closer to 100 points for every successful rapid checkout inspection with no errors or the with the value going lower as the customer has increased trouble with accurately scanning items being placed into the cart. In one embodiment, a threshold low rapid checkout score can be utilized, wherein customers going below a certain score must talk with the customer assistance desk or take a brief class to regain an ability to use the customer scan and rapid checkout process.

A location of a portable computerized device of the customer can be monitored while the customer is shopping. The inspection list for the shopper can include a classification based upon the pattern that the device took through the store and perceived risk based upon the pattern. Areas wherein items are frequently pilfered, such as the pharmacy or the music sections can be flagged and the inspection list can include a warning that the customer visited these areas. A customer can put the device down, and go to these areas without the device recording such a presence. However, in such an instance, the device will include several minutes without movement, and such a gap in movement of the device can be flagged.

Stores utilize security personnel. Such personnel sometimes watch a customer suspected of dishonest behavior. Security personnel could identify shoppers using the customer scan and rapid checkout process by the monitored location of the shopper's device. In the event that undercover security becomes concerned that a shopper has put an item in the cart without scanning it, the security personnel can flag the inspection list of the shopper without alerting the shopper, thereby instructing the inspecting employee to look for a particular item or to take special care in inspecting the particular order.

Items in a store are frequently quantified by weight. Known processes used in self-scan checkout lanes require a shopper to put each item on a scale, thereby permitting the system to check to make sure that purchased items weigh the expected amount. In the event of a weight disparity, a store employee is sent to check on whether an error has occurred. A similar system can be employed with the present disclosure. A customer can be asked to place the cart including the goods on a scale to confirm an overall weight of the order. In the alternative, the customer can be asked to take the goods out of the cart and place it on a scale to weigh the entire order. Such a process could be provided as part of a service to bag the items. The scale can check and alert store employees if the weight does not match, and a store employee can be present to bag the products without alerting the customer that the employee is also present to confirm and error-proof the weighing process. Such a process can include an exception for bulk goods or items with unknown weights.

Figure 1:
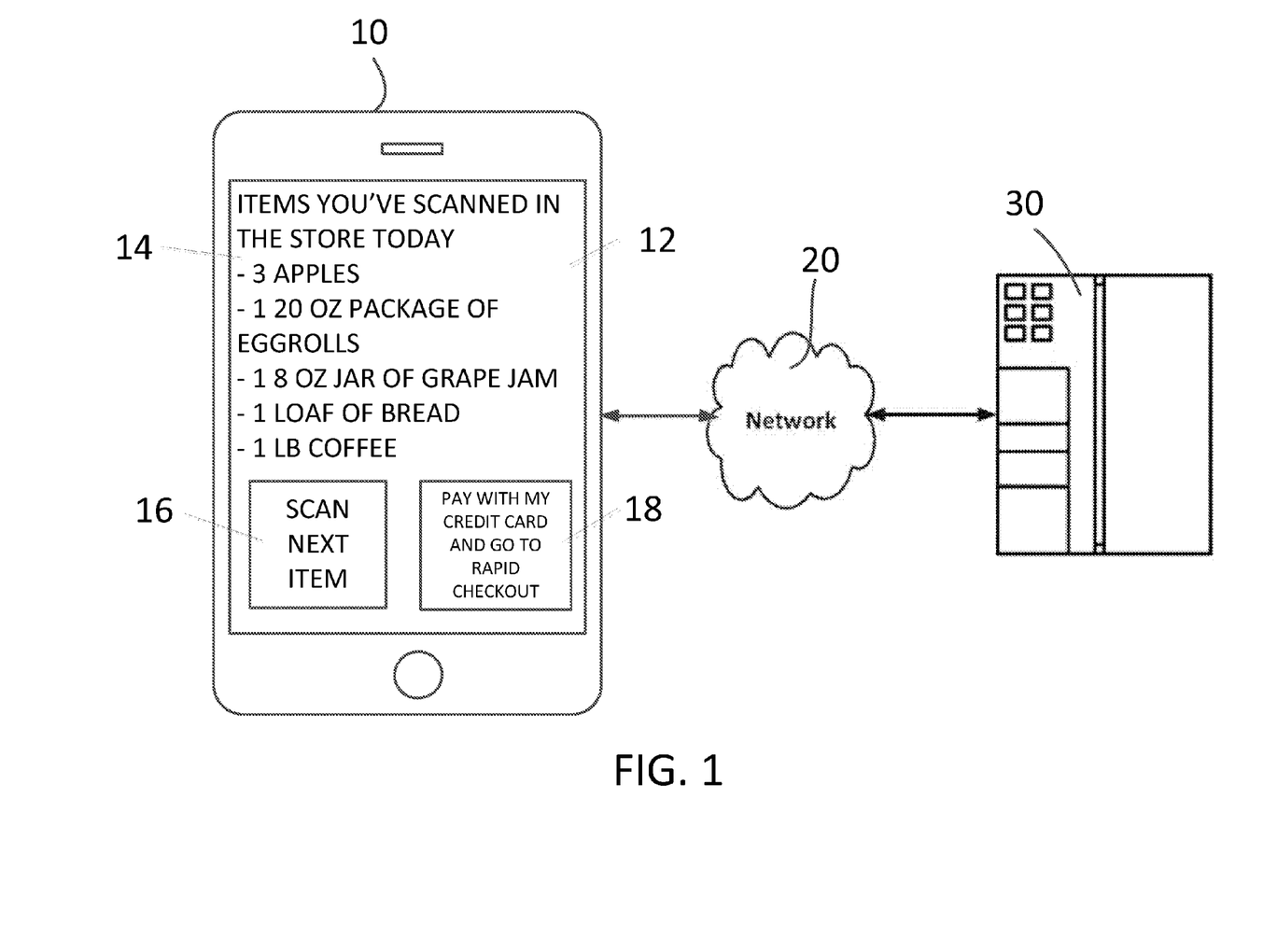
FIG. 1 is a schematic illustrating an exemplary portable computerized device containing a customer's product list in communication with a server via a network, according to some embodiments of the present disclosure.

Referring now to FIG. 1, a portable computerized device is illustrated in communication with a product location index server. In some embodiments, as shown in the illustrative example, the portable computerized device 10 is displaying a graphical user interface (GUI) 12 configured as a touch screen device that is displaying an electronic billing statement comprised of a plurality of items scanned for purchase by the customer. As the customer traverses the store, items desired are scanned, the scans are used to identify the item in a product database in server 30, and the customer places the items in a shopping cart in preparation for checkout. Device 10 and server 30 communication through wireless network 20

GUI 12 presents to the customer a list 14 of products already scanned. List 14 is maintained as an electronic billing statement, for example, by programming on server 30 in preparation for the customer signaling an intent to checkout and pay a total of the electronic billing statement. When list 14 is longer than can be displayed on the GUI 12, the list can be scrollable. Buttons 16 and 18 are presented to the customer, prompting the customer to scan an additional item or to initiate the checkout process, and, in the illustrated embodiment, arrange payment of the total with a registered credit card account. Such payment with a registered credit card can require fraud prevention authentication, for example, including a password protected account and/or presentation of identification to a store employee. As the customer initiates the process to checkout, the electronic billing statement including the list of items scanned can be used to generate an inspection list for a store employee to use to check the cart of the customer and clear the customer to leave the store.

Figure 2:
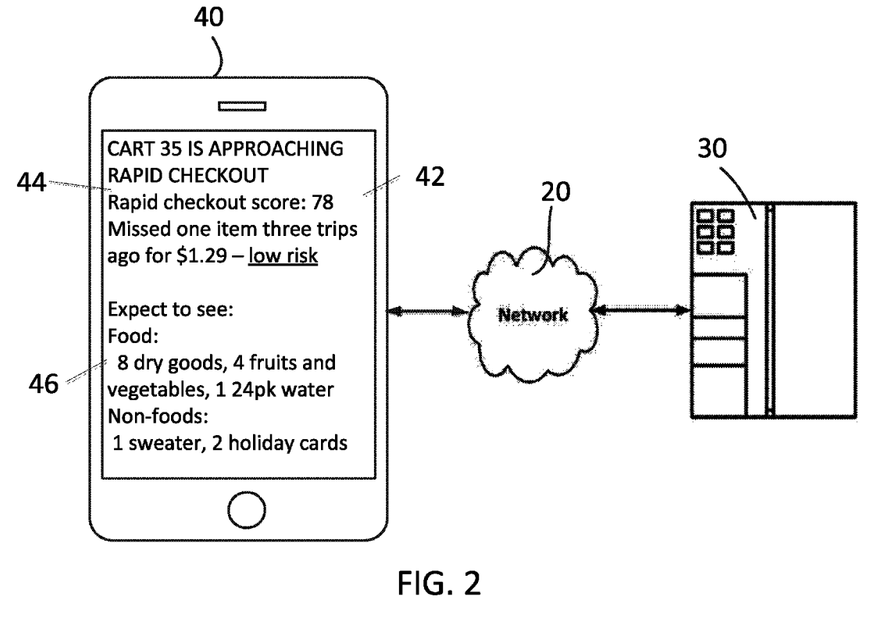
FIG. 2 is a schematic illustrating an exemplary portable computerized device used by a store employee during rapid checkout inspection of a shopping cart, the device in communication with a server via a network, according to some embodiments of the present disclosure.

FIG. 2 schematically illustrates a portable computerized device configured for use by a store employee for the purpose of inspecting a customer's shopping basket during a rapid checkout. Portable computerized device 40 is illustrated including GUI 42. Device 40 communicates with server 30 through wireless network 20.

GUI 42 is illustrated presenting details of a shopping cart of a customer approaching the rapid checkout area. Message 44 is illustrated, providing an identification of a particular shopping cart being used by the customer in question. Such an identification, cart 35, can be provided as a small placard mounted to the cart. In another embodiment, the software of device 40 can graphically point to the cart in question, for example with an arrow enabled by a locating device on both the portable computerized device of the customer and the portable computerized device of the employee. Message 44 further provides details about the customer, in the illustrated example, providing a rapid checkout score of the customer, a last error recorded in a checkout by the customer, and a risk evaluation of the customer. Message 46 provides a categorical summary of items that should be expected in the shopping cart. The items in this example are categorized by type, particularly, into food and non-food items. A number of different types and distinctions can be drawn in order to aid the employee in quickly reviewing the items of the customer's cart. The employee, after reading this summary, can briefly look over the cart of the customer and identify any noticeable discrepancy between the inspection list and the actual contents of the cart. GUI 42 can include a button or other input permitting the employee to clear the customer for payment and exiting of the store.

Figure 3:
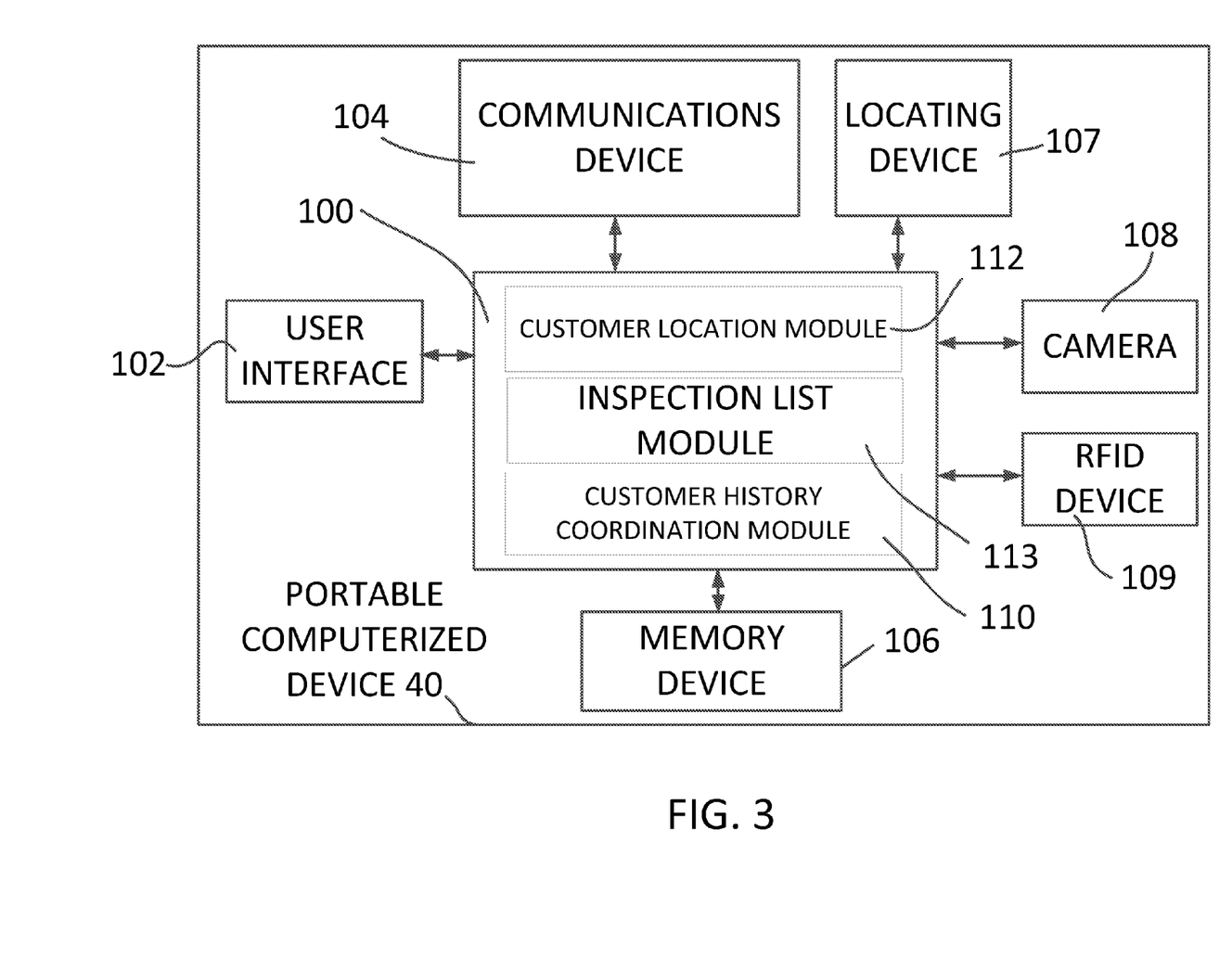
FIG. 3 is a schematic illustrating exemplary components of the portable computerized device of FIG. 2, according to some embodiments of the present disclosure.

Referring now to FIG. 3, a schematic illustrating exemplary components of the portable computerized device of FIG. 2 is illustrated. In the illustrative embodiment, the portable computerized device 40 includes a processing device 100, a user interface 102, communication device 104, a memory device 106, a locating device 107, a camera device 108, and a Radio Frequency Identification Device (RFID) 109. It is noted that the portable computerized device 40 can include other components and some of the components are not always required. While device 40 from FIG. 2 is illustrated, device 10 from FIG. 1 can be similarly described with similar components.

The portable computerized devices of the present disclosure can include non-limiting examples of a smart phone device, a tablet computer, a processor equipped pair of eyeglasses configured to project graphics upon a view of the wearer, or any other similar computerized device capable of operating the processes disclosed herein.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the portable computerized device 40. In the illustrative embodiment, the processing device 100 also executes a customer history coordination module 110, a customer location module 112, and an inspection list module 113, which are described in greater detail below.

User interface 102 is a device that allows a user to interact with the portable computerized device 40. While one user interface 102 is shown, the term "user interface" can include, but is not limited to, a touch screen, a physical keyboard, a mouse, a microphone, and/or a speaker. The communication device 104 is a device that allows the portable computerized device 40 to communicate with another device, e.g., the product location index server 30, via the network 20.

The communication device 104 can include one or more wireless transceivers for performing wireless communication and/or one or more communication ports for performing wired communication.

The memory device 106 is a device that stores data generated or received by the portable computerized device 40. Memory device 106 can include, but is not limited to, a hard disc drive, an optical disc drive, and/or a flash memory drive.

The locating device 107 determines a location of the portable computerized device 40 according to processes known in the art. According to one embodiment, locating device can include an RTLS device, for example, utilizing cell phone tower signals to determine a location of the device.

The camera 108 is a digital camera that captures a digital photograph. Camera 108 receives an instruction to capture an image, captures an image of an object, i.e., a barcode of a product, and outputs the digital photograph. The digital photograph can be a bitmap, a JPEG, a GIF, or any other suitably formatted file. The camera 108 can receive the instruction to capture the image from the processing device 100 and can output the digital photograph to the processing device 100. According to one embodiment, in the event that the customer forgot to scan one item, the employee inspecting the cart can correct the issue by scanning the barcode of the item missing from the billing statement.

The Radio Frequency Identification Device (RFID) 109 can determine proximity of device 40 to items marked with an RFID chip. As disclosed herein, high value items or items subject to pilfering can be marked with such chips, and the inspection list can be cross-checked with a reading on device 40 regarding how many items with RFID chips the cart has within the cart basket.

The customer history coordination module 110 includes programming to coordinate with server 30 to determine and display customer information upon GUI 12. Module 110 can include, for example, an algorithm to determine the customer's risk level or the customer's rapid checkout score based upon information gathered from the server.

Customer location module 112 can access information from locating device 107 and data from server 30 including information about the location of the device of the customer to provide information enabling the employee to locate the customer intended to execute a rapid checkout. Such information regarding the relative location of the customer to the employee can be presented to the employee according to a number of exemplary embodiments.

Inspection list module 113 receives information from server 30 and an provides details to the employee regarding what items the customer has scanned and what the employee should expect to see in the shopping cart.

Embodiments in accordance with the present disclosure may be embodied as an device, process, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied an any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 4:
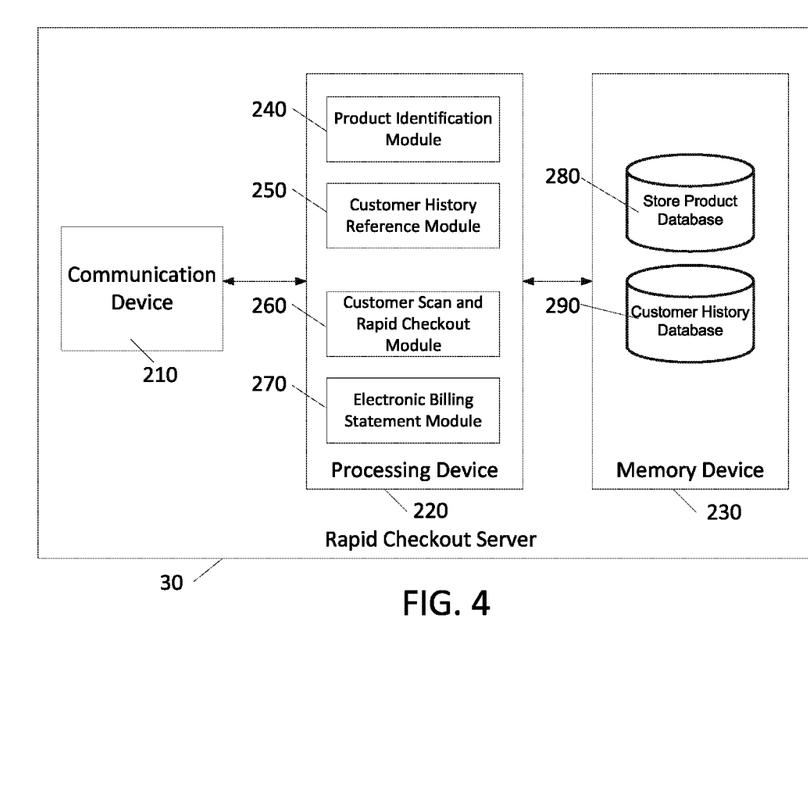
FIG. 4 is a schematic illustrating exemplary components of a quick checkout server, according to some embodiments of the present disclosure.

FIG. 4 is a schematic illustrating an exemplary rapid checkout server, according to some embodiment of the disclosure. In the illustrated embodiment, the rapid checkout server 30 may include a processing device 220, a communication device 210, and memory device 230.

The processing device 220 can include memory, e.g., read only memory (ROM) and random access memory (RAM), storing processor-executable instructions and one or more processors that execute the processor-executable instructions. In embodiments where the processing device 220 includes two or more processors, the processors can operate in a parallel or distributed manner. In the illustrative embodiment, the processing device 220 executes one or more of a product identification module 240, a customer history reference module 250, a customer rapid scan and checkout module 260, and an electronic billing statement module 270.

The communication device 210 is a device that allows the rapid checkout server 30 to communicate with another device, e.g., a portable computerized device through a wireless communication network connection. The communication device 210 can include one or more wireless transceivers for performing wireless communication and/or one or more communication ports for performing wired communication.

The memory device 230 is a device that stores data generated or received by the rapid checkout server 30. The memory device 230 can include, but is not limited to a hard disc drive, an optical disc drive, and/or a flash memory drive. Further, the memory device 230 may be distributed and located at multiple locations. The memory device 230 is accessible to the processing device 220. In some embodiments, the memory device 230 includes a store product database 280 and a customer history database 290.

In some embodiments, the store product database 280 stores information about a product, including weight, size, cost, and other information regarding the product. The store product database 280 may further store other information about a particular product, including price, weight, availability, and similarity of the product to other available products. The store product database 280 can further include information about how likely a particular product is to be taken without payment, historical records of how many items are lost each year, etc.

Customer history database 290 can be used to store information about a particular customer, for example, within a registered account that can be linked to a customer's phone number or email address. As disclosed herein, a customer wishing to use a customer scan and rapid checkout process can be required to register an account with the store. Historical details regarding past attempts to use the rapid checkout process can be stored in database 290 and accessed by customer history reference module 250, including other information that can be used to set a risk level and/or a rapid checkout score of the customer.

The product identification module 240 can monitor or receive information about a product that has been scanned and reference the store product database 280 to determine, based upon a scanned image like a UPC symbol, the cost of the product. Electronic billing statement module 270 can manage information related to the identified product such as cost and can manage a pending virtual shopping cart.

Customer rapid scan and checkout module 260 can include programming to coordinate operation of the process disclosed herein for a customer to scan items for purchase and enable for rapid checkout of the items. In one embodiment, module 260 can communicate the electronic billing statement maintained by module 270 to a store operated server or directly to the portable computerized device 40 of the employee for use during the inspection and checkout process.

Figure 5A:
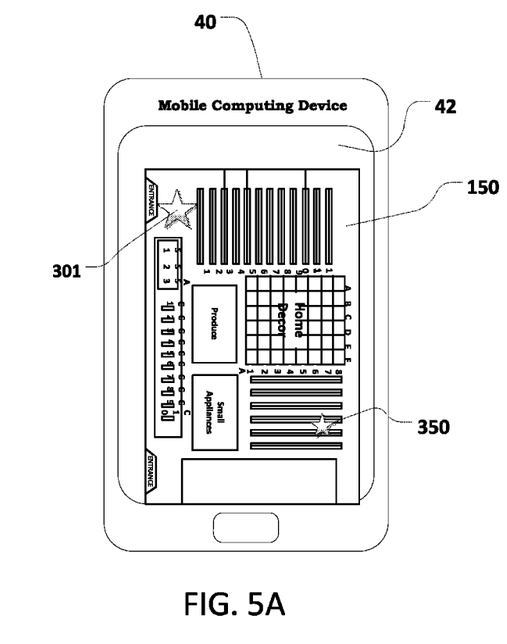
FIGS. 5A and 5B illustrates maps on an exemplary portable computerized device illustrating the locations of both a shopper and a store employee, according to some embodiments of the present disclosure.

Referring to FIG. 5A, map 150 is displayed on portable computerized device 40. In some embodiments, the portable computerized device 40 can display the location of the customer in real time as the customer travels throughout the store. In this way, the store associate can reference his or her location, represented by You-Are-Here icon 301, in relation store landmarks and customer location icon 350 and be better able to locate the customer in the store. It is noted that the example map 150 is provided for example and not intended to be limiting.

Figure 5B:
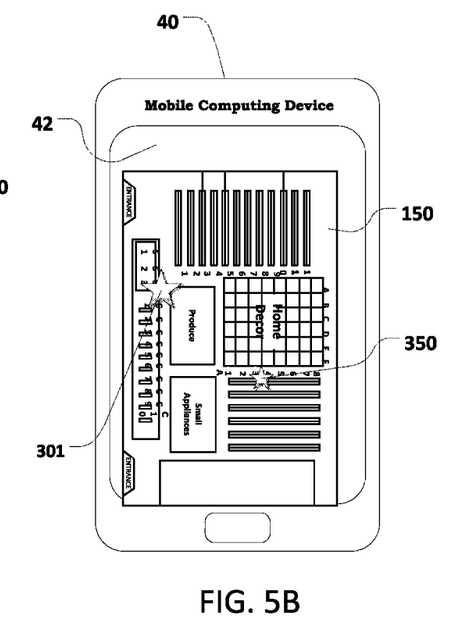

Referring to FIG. 5B, You-Are-Here icon 301 is displayed on map 150 on portable computerized device 40. It is shown in a new location, indicating that the user has moved to a new location and the You-Are-Here icon 301 on portable computerized device 40 is keeping track of the user's progress. Notice that the customer's location, icon 350, has also changed position, reflection a change in the customer's location as he or she continues shopping.

Figure 6:
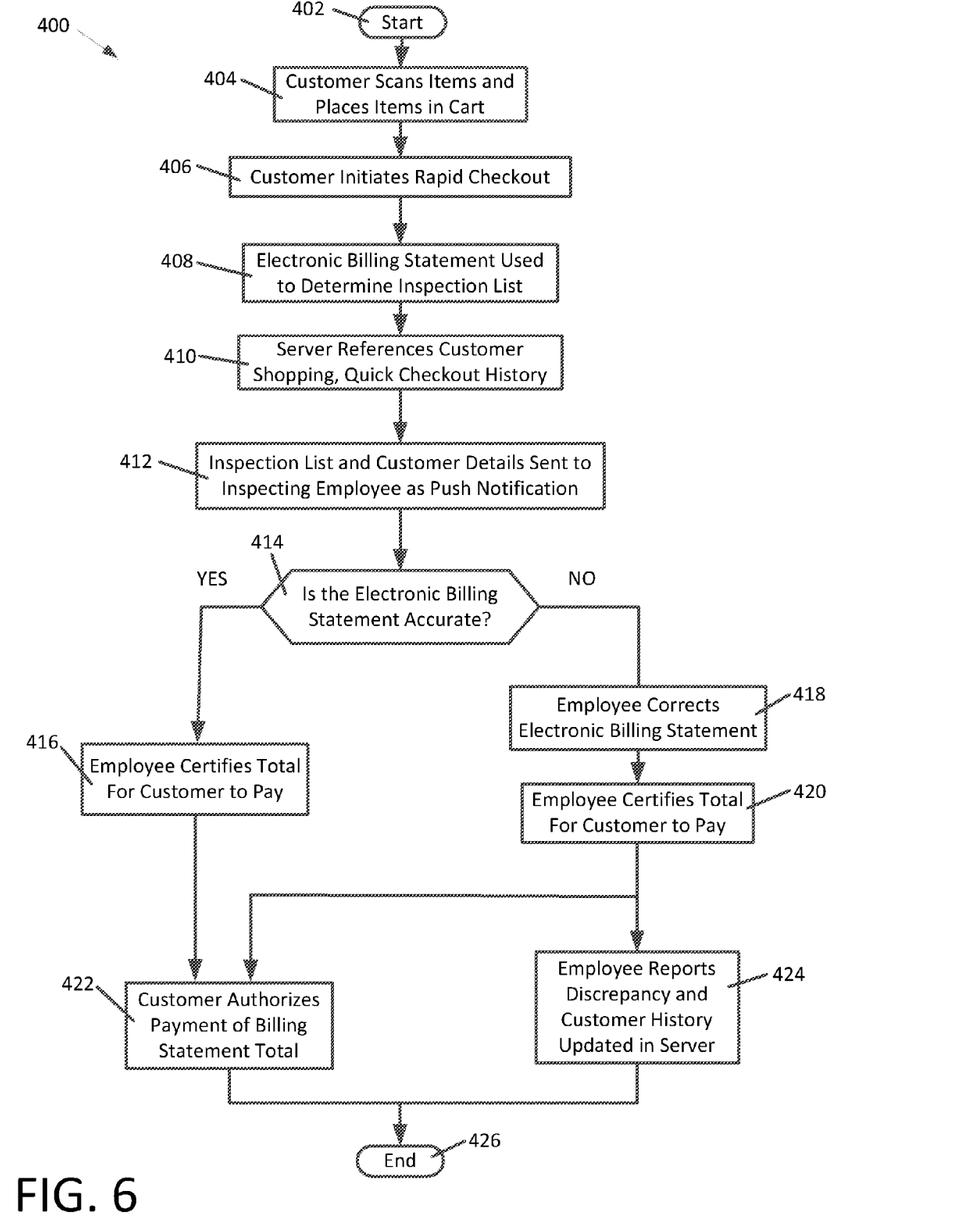
FIG. 6 illustrates a flowchart for an exemplary process for a rapid checkout including an inspection by a store employee of a customer's basket including items scanned for purchase by the customer, according to some embodiments of the present disclosure.

FIG. 6 illustrates a flowchart for an exemplary process for a rapid checkout including an inspection by a store employee of a customer's basket including items scanned for purchase by the customer. Process 400 begins at step 402. At step 404, the customer, while shopping in the retail store, scans a plurality of items for purchase and places the items in a shopping cart. In an alternative non-limiting embodiment, the customer can place the items in a shopping bag or bags or a hand-held basket. At step 406, the customer initiates a rapid checkout, expressing an intent to pay and leave the store based upon an electronic billing statement generated by the scans of step 404. At step 408, details from the electronic billing statement are used according to processes disclosed herein to determine or create an inspection list for use by a store employee. At step 410, the server references customer shopping history and quick checkout history for the customer, enabling the store employee to receive customer specific details regarding the customer. At step 412, the inspection list and the customer details are sent to the inspecting employee as a push notification. At step 414, the store employee, in the course of an inspection of the cart of the employee, makes a determination whether the electronic billing statement is accurate. If the billing statement is determined to be accurate, the employee certifies a total for the customer to pay based upon the billing statement, and the customer pays the total at step 422. If the billing statement is not determined to be accurate, the store employee, at step 418, enters corrections as necessary to the electronic billing statement. At step 420, the employee certifies an amount for the customer to pay based upon the corrected billing statement. The customer pays the amount certified by the employee at step 422 and the employee reports the discrepancy/error determined in the inspection and the server is updated at step 424. Process 400 ends at step 426.

The flowchart and block diagrams in the flow diagrams illustrate the architecture, functionality, and operation of possible implementations of systems, processes, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing device to function in a particular manner, such that the instructions stored in the computer-readable medium produce an article of manufacture including instruction means which implement the function/act specified in the flowchart and/or block diagram block or blocks.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A process for inspecting a shopping cart in preparation for a rapid checkout from a retail store, the process comprising:

monitoring, through an electronic billing statement module of a processor within a server, an initiation of the rapid checkout by a customer;

monitoring, through a product identification module of the processor within the server, a plurality of items scanned by the customer;

analyzing the plurality of items scanned by the customer as a function of a store product database stored within memory within the server, the store product database including a plurality of secondary information associated with each item;

flagging at least one item of the plurality of items, the at least one item being listed as a high value item in the plurality of secondary information associated with the at least one item;

generating, through an inspection list module within the server, an inspection list for a store employee based upon a presence of the at least one item among the plurality of items, the inspection list including a summary of items scanned by the customer and generated data related to the summary of items and the plurality of secondary information;

detecting, through a customer location module of the processor within the server, a location of a portable computerized device associated with the customer;

establishing a location of the customer based on the location of the portable computerized device associated with the customer;

generating and displaying a map on a portable computerized device of the store employee, wherein the map includes an indication of the location of the customer in real time as the customer travels through the retail store;

generating, through a customer scan and rapid checkout module of the processor within the server, the inspection list to the store employee as a push notification to the portable computerized device of the store employee in response to the location of the customer indicating that the customer is approaching the store employee;

scanning, by an RFID chip reader of the portable computerized device of the store employee, all products in the shopping cart;

determining a number of products in the shopping cart marked with an RFID chip using the RFID chip reader; and comparing the number of products in the shopping cart marked with an RFID chip to an expected number of products with an RFID chip on the inspection list.

2. The process of claim 1, further comprising, monitoring, through a customer history coordination module of the processor within the server, an electronic billing statement comprising a list of items scanned for purchase by the customer; and wherein the inspection list is further based upon the electronic billing statement.

3. The process of claim 1, the process further comprising referencing a customer history database of the processor within the server and retrieving a rapid checkout history for the customer, the rapid checkout history comprising a list of errors incurred during previous rapid checkouts of the customer.

4. The process of claim 3, further comprising determining, as a function of the customer history database, a risk level of the customer based upon the rapid checkout history.

5. The process of claim 4, further comprising monitoring, through the customer location module of the processor within the server, a pattern that the customer traveled through the retail store during a shopping trip; and wherein determining the risk level of the customer is further based upon the pattern.

6. The process of claim 3, further comprising determining, as a function of the customer history database, a rapid checkout score of the customer based upon the rapid checkout history.

7. The process of claim 1, wherein generating the inspection list comprises categorizing items on the inspection list according to item type.

8. The process of claim 1, wherein generating the inspection list comprises highlighting items that are regularly taken without payment from the retail store.

9. The process of claim 1, further comprising,
monitoring, through a point of sale system, an electronic billing statement comprising a list of items scanned for purchase by the customer; and
updating, through the portable computerized device of the store employee, the electronic billing statement based upon an error found by the store employee, the error including a discrepancy between the inspection list and the products within the shopping cart.

10. The process of claim 9, further comprising updating a customer history within a customer history database based upon the error.

11. The process of claim 9, further comprising, within a processor of the portable computerized device associated with the customer, initiating payment of an order total based upon the electronic billing statement, as updated.

12. The process of claim 1, further comprising monitoring an input regarding the customer entered by store security personnel; and
wherein generating the inspection list further includes the input.

13. A computerized server for inspecting a shopping cart in preparation for a rapid checkout from a retail store comprising:
a processor including:
an electronic billing statement module configured to:
initiate the rapid checkout of a customer;
a product identification module configured to:
monitor a plurality of items scanned for purchase by the customer, the electronic billing statement module further configured to maintain an electronic billing statement based upon the plurality of items;
analyze the plurality of items scanned by the customer as a function of a store product database within memory within the computerized server, the store product database including a plurality of secondary information associated with each item;
flag at least one item of the plurality of items, the at least one item being listed as a high value item in the plurality of secondary information associated with the at least one item;
an inspection list module configured to:
generate an inspection list for a store employee based upon a presence of the at least one item among the plurality of items, the inspection list including a summary of items scanned by the customer and generated data related to the summary of items and the plurality of secondary information;
a location module configured to:
detect a location of the customer based on a location of a portable computerized device associated with the customer; and
generate and display a map on a portable computerized device of the store employee, wherein the map includes an indication of the location of the customer in real time as the customer travels through the retail store; and
a customer scan and rapid checkout module configured to:
generate the inspection list to the store employee as a push notification to the portable computerized device of the store employee in response to the location of the customer indicating that the customer is approaching the store employee;
scan, by an RFID chip reader, all products in the shopping cart;
determine a number of products in the shopping cart marked with an RFID chip using the RFID chip reader; and
compare the number of products in the shopping cart marked with an RFID chip to an expected number of products with an RFID chip on the inspection list.

14. The computerized server of claim 13, further comprising a customer history reference module configured to:
reference a customer history database to determine a rapid checkout history of the customer; and
wherein the customer scan and rapid checkout module are further configured to:
provide to the portable computerized device of the store employee the rapid checkout history of the customer.

* * * * *